US012645390B2

(12) United States Patent
Worfolk

(10) Patent No.: US 12,645,390 B2
(45) Date of Patent: ***Jun. 2, 2026

(54) WORD BASED CHANNELS LAST ORDERING IN MEMORY

(71) Applicant: Synaptics Incorporated, San Jose, CA (US)

(72) Inventor: Patrick Worfolk, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/675,361

(22) Filed: May 28, 2024

(65) Prior Publication Data

US 2024/0311043 A1     Sep. 19, 2024

Related U.S. Application Data

(63) Continuation of application No. 17/898,262, filed on Aug. 29, 2022, now Pat. No. 12,026,396.

(60) Provisional application No. 63/240,770, filed on Sep. 3, 2021.

(51) Int. Cl.
| *G06F 12/00* | (2006.01) |
| *G06F 3/06* | (2006.01) |

(52) U.S. Cl.
CPC .......... *G06F 3/0655* (2013.01); *G06F 3/0604* (2013.01); *G06F 3/0673* (2013.01)

(58) Field of Classification Search
CPC .... G06F 3/0655; G06F 3/0604; G06F 3/0673; G06N 3/063; G06N 3/0464
USPC ......................................................... 711/154
See application file for complete search history.

(56) References Cited

U.S. PATENT DOCUMENTS

| 1,188,744 | A | | 6/1916 | English | |
| 11,188,744 | B2 | * | 11/2021 | Chen ................ | G06V 30/19173 |
| 2019/0266418 | A1 | | 8/2019 | Xu et al. | |
| 2021/0117806 | A1 | * | 4/2021 | Liu ........................ | G06N 3/105 |
| 2022/0309336 | A1 | | 9/2022 | Minkin et al. | |

FOREIGN PATENT DOCUMENTS

| GB | | 2596239 | A | * | 12/2021 | ............. | G06F 17/15 |
| JP | | 2023503536 | A | * | 1/2023 | ............. | G06V 10/82 |

* cited by examiner

*Primary Examiner* — Mardochee Chery
(74) *Attorney, Agent, or Firm* — Leydig, Voit & Mayer, Ltd.

(57)     ABSTRACT

A memory device having a plurality of groups of words is provided. Each group of the plurality of groups of words are stored in a contiguous section of a memory and each group of the plurality of groups of words includes a plurality of words. The plurality of words each have a plurality of elements with a same set of index values for a first dimension of a tensor and a same set of index vales for a second dimension of a tensor. The plurality of words have a different index value for a third dimension of the tensor.

16 Claims, 8 Drawing Sheets

400

| Element Ordering | 0 | 1 | 2 | 3 | ••• | W | W+1 | W+2 | ••• | H*W | H*W+1 | ••• |
|---|---|---|---|---|---|---|---|---|---|---|---|---|
| c,h,w | 0,0,0 | 0,0,1 | 0,0,2 | 0,0,3 | ••• | 0,1,0 | 0,1,1 | 0,1,2 | ••• | 1,0,0 | 1,0,1 | ••• |

| Element Ordering | 0 | 1 | 2 | 3 | ••• | C | C+1 | C+2 | ••• | C*W | C*W+1 | ••• |
|---|---|---|---|---|---|---|---|---|---|---|---|---|
| h,w,c | 0,0,0 | 0,0,1 | 0,0,2 | 0,0,3 | ••• | 0,1,0 | 0,1,1 | 0,1,2 | ••• | 1,0,0 | 1,0,1 | ••• |

| Element Ordering | 0 | 1 | 2 | 3 | 4 | 5 | 6 | 7 | ••• | 4*C-4 | 4*C-3 | 4*C-2 | 4*C-1 | ••• |
|---|---|---|---|---|---|---|---|---|---|---|---|---|---|---|
| h,w,c | 0,0,0 | 0,1,0 | 0,2,0 | 0,3,0 | 0,0,1 | 0,1,1 | 0,2,1 | 0,3,1 | ••• | 0,0,C-1 | 0,1,C-1 | 0,2,C-1 | 0,3,C-1 | ••• |

*FIG. 6*

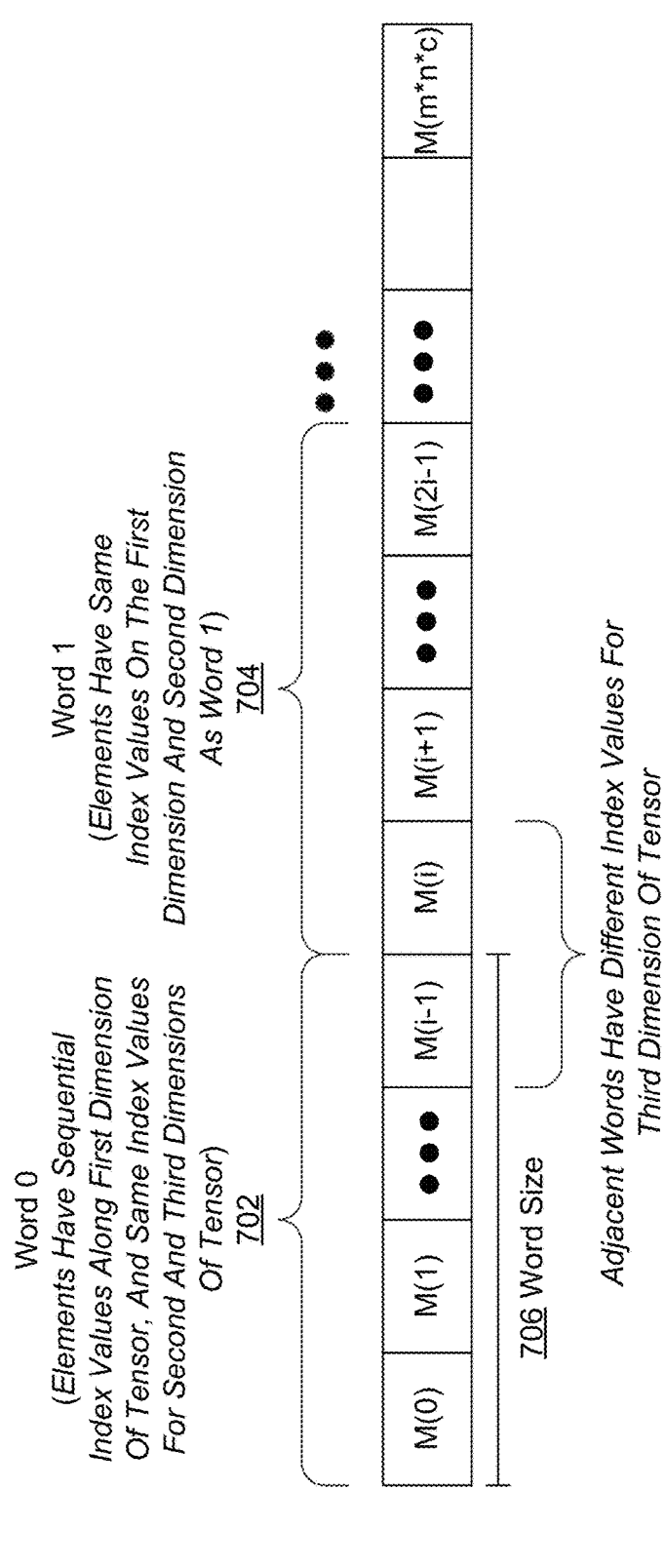

Memory Array Storing Tensor 700

Word 0
(Elements Have Sequential Index Values Along First Dimension Of Tensor, And Same Index Values For Second And Third Dimensions Of Tensor)
702

Word 1
(Elements Have Same Index Values On The First Dimension And Second Dimension As Word 1)
704

706 Word Size

Adjacent Words Have Different Index Values For Third Dimension Of Tensor

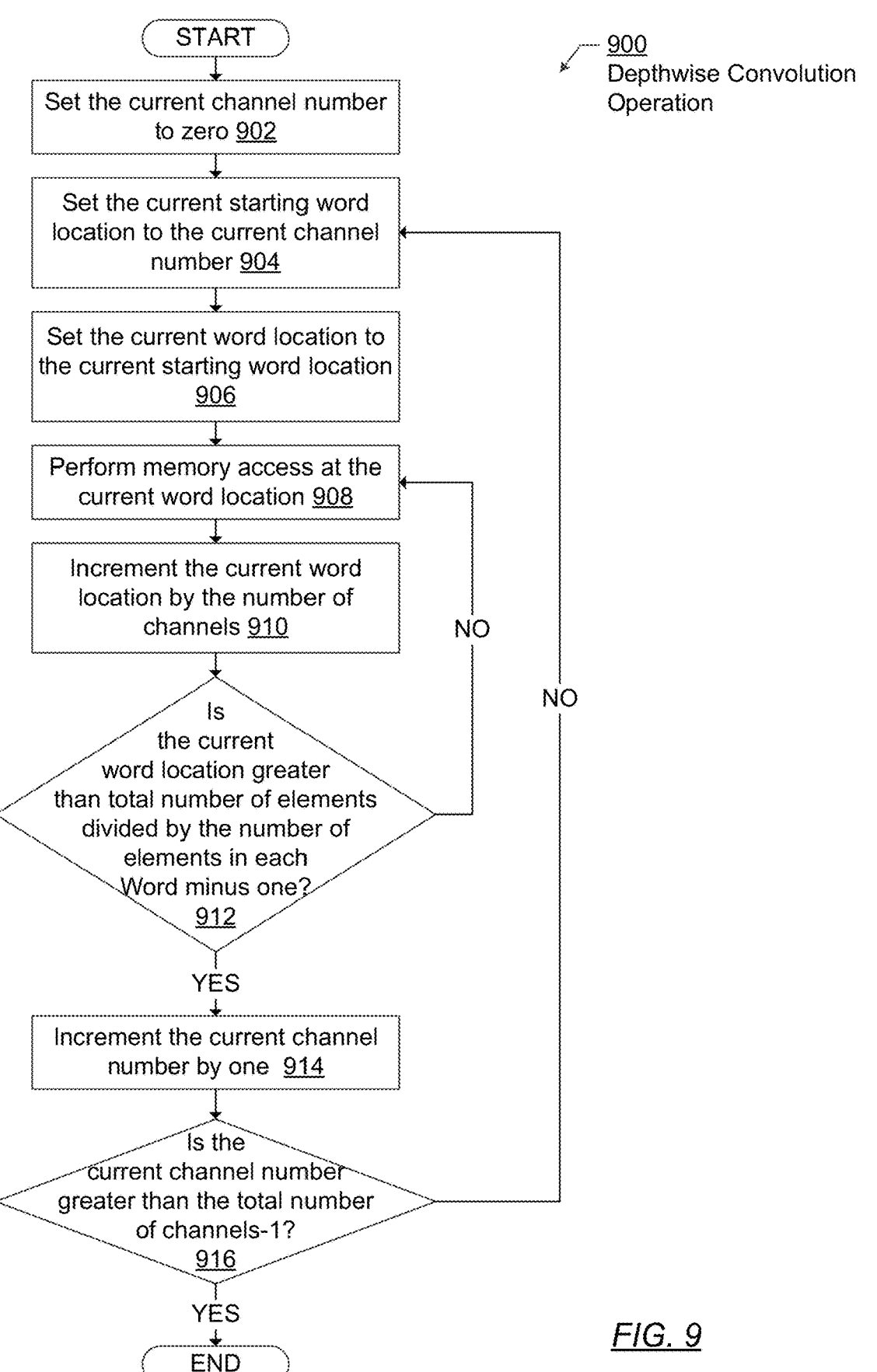
900
Depthwise Convolution
Operation
_FIG. 9_

1000
Pointwise Convolution
Operation

WORD BASED CHANNELS LAST ORDERING IN MEMORY

CROSS-REFERENCE TO RELATED APPLICATIONS

This application is a continuation of U.S. patent application Ser. No. 17/898,262, filed Aug. 29, 2022, and claims benefit to U.S. Provisional Patent Application Ser. No. 63/240,770, filed on Sep. 3, 2021, each of which is incorporated herein by reference in its entirety.

TECHNICAL FIELD

The present disclosure relates generally to the field of memory management of tensor data for neural networks.

BACKGROUND

Machine learning is a process by which a computer system learns how to perform an action without following explicit instructions. During a training phase, the computer system learns how to perform the action using training data. For example, through training, the computer system analyzes the training data and draws inferences from patterns in the training data. In a production phase, the computer system performs actions on new data based on the analysis and inferences. Often machine learning involves using a neural network. A neural network is one type of machine learning model, which takes an input, and through execution of an input layer, one or more hidden layers, and an output layer, produces a result. The input and output of at least a subset of the layers are tensors. A tensor is a data structure that maintains the association of the values with what the values represent based on the location of the values within the tensor.

SUMMARY OF THE INVENTION

This summary is provided to introduce in a simplified form a selection of concepts that are further described below in the detailed description. This summary is not intended to identify key features or essential features of the claimed subject matter, nor is it intended to limit the scope of the claimed subject matter.

In general, in one aspect, one or more embodiments relate to a computing device that includes a memory, and a processor configured to perform a first plurality of memory accesses from storage in memory of a first word and a second word. The first word has a first subset of a plurality of elements. The first subset of the plurality of elements each have a first set of sequential index values along a first dimension of a tensor, a first single index value for a second dimension of the tensor, and a second single index value for a third dimension of the tensor. The second word has a second subset of the plurality of elements. The second subset of the plurality of elements each have the first set of sequential index values along the first dimension of the tensor that is the same as the first word, the first single index value for the second dimension of the tensor that is the same as the first word, and a third single index value for the third dimension of the tensor that is different than the second single index value for the first word. The second word is adjacent to the first word in memory.

In general, in one aspect, one or more embodiments relate to a memory device that includes a first word and a second word. The first word has a first subset of a plurality of elements. The first subset of the plurality of elements each have a first set of sequential index values along a first dimension of a tensor, a first single index value for a second dimension of the tensor, and a second single index value for a third dimension of the tensor. The second word has a second subset of the plurality of elements. The second subset of the plurality of elements each have the first set of sequential index values along the first dimension of the tensor that is the same as the first word, the first single index value for the second dimension of the tensor that is the same as the first word, and a third single index value for the third dimension of the tensor that is different than the second single index value for the first word. The second word is adjacent to the first word in memory.

In general, in one aspect, one or more embodiments relate to a method that includes performing a plurality of memory accesses of a plurality of groups of words. Each group of the plurality of groups are stored in a contiguous section of memory, and wherein each group of the plurality of groups comprises a plurality of words, the plurality of words each comprising a plurality of elements having a same set of index values for the first dimension and for the second dimension as each other word in the group and a different index value for the third dimension as each other word in the group. The method further includes executing a layer of a neural network model using the plurality of memory accesses.

Other aspects of the embodiments will be apparent from the following description and the appended claims.

BRIEF DESCRIPTION OF DRAWINGS

FIG. 4 is an example diagram of a memory array organized using a channels first ordering of data.

FIG. 5 is an example diagram of a memory array organized using a channels last ordering of data.

FIG. 6 is an example diagram of a memory array organized using a word-based channels last ordering (WBCLO) of data.

FIG. 7 shows a generic diagram of a memory array organized using WBCLO.

FIG. 9 shows a flowchart, in accordance with one or more embodiments.

DETAILED DESCRIPTION

Figure 1:
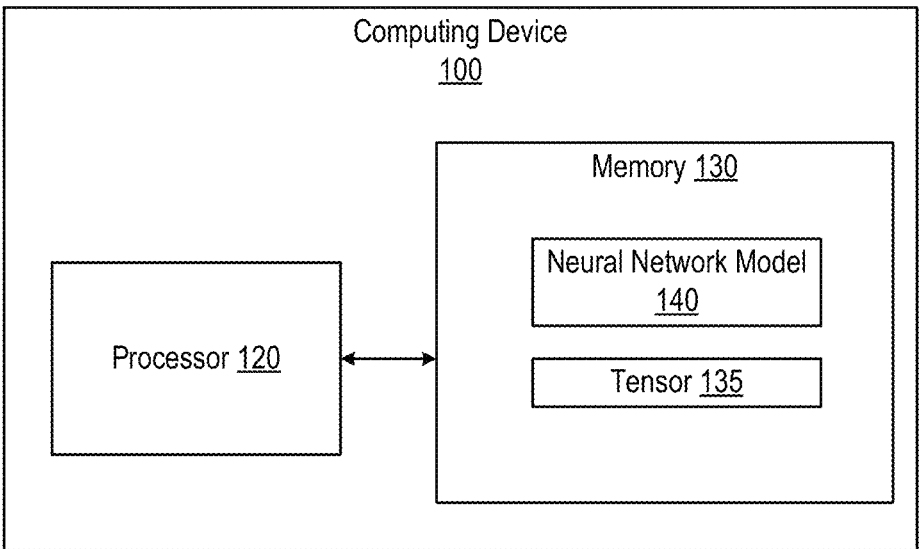
FIG. 1 is a diagram of a computing device in accordance with one or more embodiments.

The following detailed description is merely exemplary in nature and is not intended to limit the disclosed technology or the application and uses of the disclosed technology. Furthermore, there is no intention to be bound by any expressed or implied theory presented in the preceding technical field, background, or the following detailed description.

The present disclosure is directed to an improved technique for storing data of a three-dimensional (3D) data structure in memory. The 3D data structure is composed of elements, each element having a location defined by an index value identifying a row identifier, column identifier, and channel identifier. At the location, the element has a value. In order to store the 3D data structure, the elements are sequentially arranged in memory. Specifically, the 3D data structure is stored in a one-dimensional format in memory. Embodiments may be used, for example, to optimize the execution of depth-wise convolutions and point-wise convolutions by a convolutional neural network (CNN) model. Some CNN models may alternate between depth-wise and pointwise convolutions.

In a depth-wise convolution, a convolutional filter may be applied to a single channel of data at a time. Depth-wise convolution is made more efficient technique when the data is stored in memory in a channels-first format. In depth-wise convolution, when incrementing through the memory locations, a processor executing the CNN model may first access all the elements in the rows and columns of a single channel before processing the next channel.

In a pointwise convolution, a filter is applied to all channel data of a single pixel, meaning elements located at the same row and column, but different channels. Pointwise convolution is more efficient when the data is stored in memory in the channels-last format. When incrementing through the memory locations, a processor executing the CNN model may first access all channel data for one pixel before moving on to another pixel.

Many computing devices (e.g., edge devices and embedded devices) use vector-based digital signature processor (DSP) cores to implement Deep Neural Network (DNN) inferencing. An edge device is a hardware device that collects and processes data. An embedded device is a device that includes a special purpose computer system. For such architectures, a significant amount of data shuffling may occur in changing the order of elements between channels-first and channels-last formats. Alternatively, a significant amount of computational power and bandwidth may be used to keep track of the proper index value to retrieve or store the correct location in each tensor.

Furthermore, computing devices may use elements that each have an 8-bit value (i.e., the size of each element is 8-bits or one byte). However, memory may be accessed one word at a time. For example, memory architectures may use a 32-bit word size. Thus, significant inefficiencies may exist when individual bytes of data are accessed across multiple word boundaries. As one non-limiting example, one operation may only require two 8-bit values but could require two 32-bit memory accesses if those two 8-bit values are not stored in the same word.

In an edge device or other small device, elements are often quantized to bytes (i.e., the 8-bit values). Shuffling these bytes around to change ordering can require significantly more computational power than the vectorized convolutional operations themselves. The present disclosure describes a word-based channels last ordering (WBCLO) of a memory structure that is a modification of the channels-last layout. In this WBCLO ordering, bytes in a word are from the same row and channel of the input/output tensor, allowing more efficient reading and writing of data at word boundaries.

FIG. 1 is a diagram of a computing device (100) in accordance with one or more embodiments. The computing device (100) may be any type of processing system that can process image data. By way of example, computing device (100) may be a mobile phone, a tablet device, a laptop computer, a desktop computer, a server, etc. For example, the compute device may be an AI-at-the-edge IoT device.

Computing device (100) comprises a processor (120) and a memory (130). Memory (130) is configured to store one or more tensors T (135) and an executable neural network model (140). In one or more embodiments the neural network model is a convolutional neural network (CNN) model that performs image processing. In an embodiment, processor (120) is configured to process an input image (110) (one of the tensors (135)) by executing the CNN model. The processor executing the CNN model may store intermediate results in a 3-dimensional tensor. In an embodiment, the dimensions may be described as height, width, and number of channels. In other embodiments, elements may be stored in any arrangement desired. By way of example and not limitation, tensor T may have height "H", width "W", and channels "C". In an example embodiment, height H represents the number of rows and width W represents the number of columns in an image.

In an embodiment, processor (120) may access memory for read and write operations using, for example, 32-bit words. A 32-bit word size is common in many embedded processors. However, this is by way of illustration and should not be construed to limit the scope of the disclosure and claims. In other embodiments, processor (120) may access memory for read and write operations using, for example, 64-bit words, or larger. Further, other user devices may be used.

Figure 2:
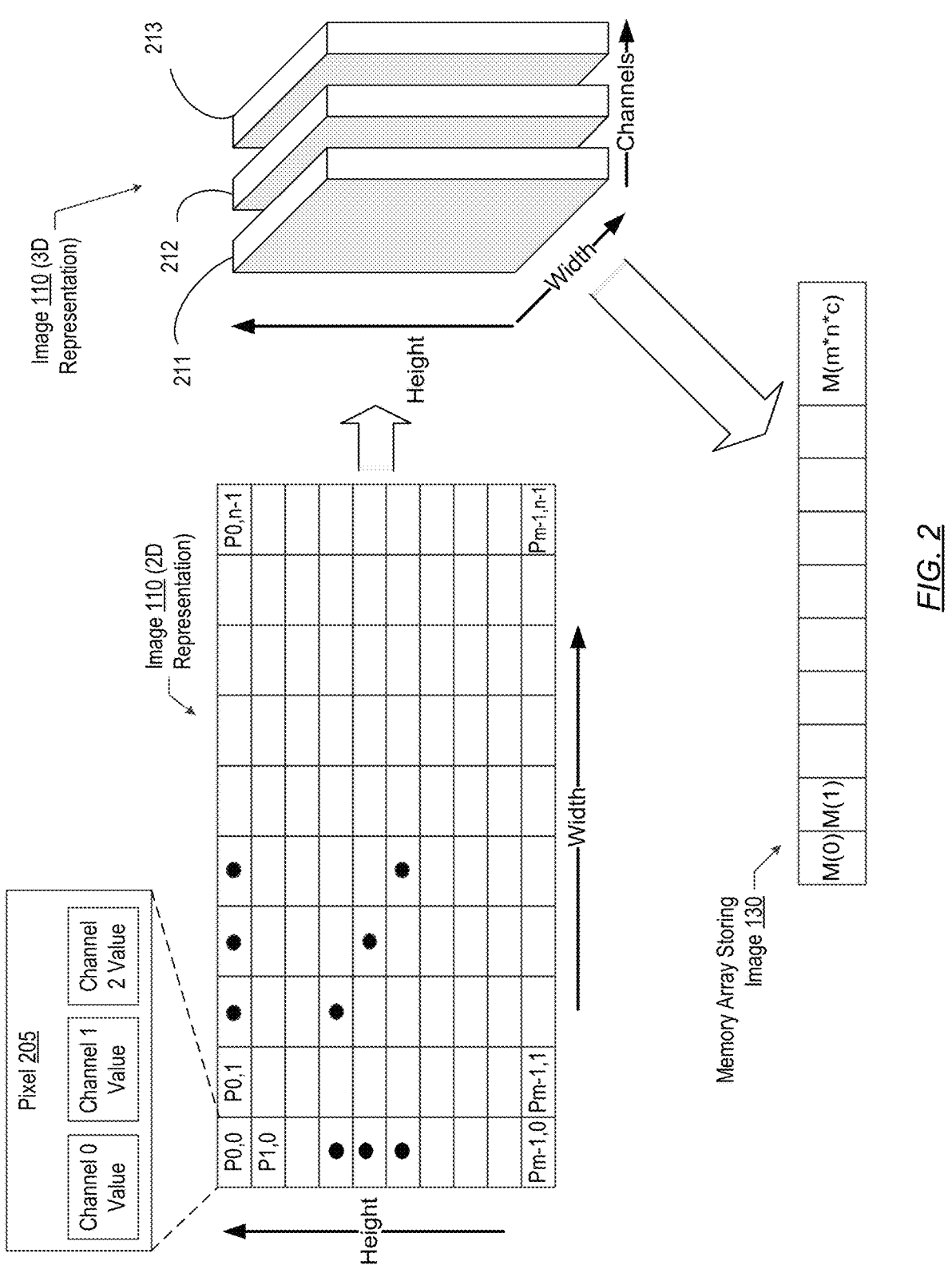
FIG. 2 is a diagram of an image in a memory structure in accordance with one or more embodiments.

FIG. 2 is a diagram of the image (110) in a memory structure in accordance with one or more embodiments. Specifically, FIG. 2 shows a diagram of an input image that may be input into a CNN. In FIG. 2, the input image is the initial tensor. Collinear dots in the figures are used to denote that any number of items of the same type as before and/or after the collinear dots may exist. For example, in FIG. 2, the collinear dots indicate that any number of pixels may exist, and embodiments are not limited to the grid size shown in FIG. 2. FIG. 2 includes both a two-dimensional (2D) representation and a 3D (3D) representation of the image (110). In the 2D representation, the image (110) includes "m" rows of pixels arranged in "n" columns to form an (m×n) array. Thus, the height H=m and the width W=n.

Each pixel comprises three distinct elements. Each element has a channel of information. By way of example, pixel (205) located in the first row, first column (P1,1) may include three channel values: Channel 0 value, Channel 1 value, and Channel 2 value. In an embodiment, the Channel 0 value, Channel 1 value, and Channel 2 value may represent red, green, blue (RGB) color values, respectively. In other embodiments, however, the Channel 0 value, Channel 1 value, and Channel 2 value may represent other pixel attributes.

Thus, the first row of pixels contains pixel information for "n" pixels, namely pixels P(0,0) through pixel P(0, n−1). Similarly, the second row of pixels contains pixel information for "n" pixels, namely pixels P(1,0) through pixel P(1, n−1). The same is true for the remaining rows. The last row, row "m" contains pixel information for "n" pixels, namely pixels P(m−1,0) through pixel P(m−1, n−1).

In the 3D representation of image (110), the three values of channel information are separated into three separate channel layers. By way of example, the channel (211) may include the Channel 0 values for all (m×n) pixels in image (110). Likewise, the channel (212) may include the Channel 1 values for all (m×n) pixels in image (110). Similarly, the channel (213) may include the Channel 2 values for all (m×n) pixels in image (110). In the example, the total number of channel values is therefore (m*n*c). Therefore, the total number of elements is m*n*c.

The 3D representation of the image (110) is an example of a tensor. The layers of the CNN model each process an input tensor (e.g., input image for the first layer) to the layer to produce an output tensor that is passed as the input tensor to the next layer of the CNN model. Each tensor is composed of a number of elements located at a location defined by index value specifying a row identifier, column identifier, and channel identifier. For example, for the input image, the channel 2 value at P0,1 is an element and the channel 3 value at P0,1 is a different element. The number of elements in the input tensor used by a layer may be different than the number of elements in the output tensor produced by the layer, which is used as input to the next layer.

Continuing with FIG. 2, the elements are stored in sequential memory locations M(1) to M(m*n*c) in a memory array (130) an area of memory (130). Thus, the 3D data structure is stored in a one-dimensional (1D) memory. Each location corresponds to storage for a single element of the tensor. One or more embodiments are directed to an ordering for storing elements of the tensor into memory (as described in FIG. 7 below).

Figure 3:
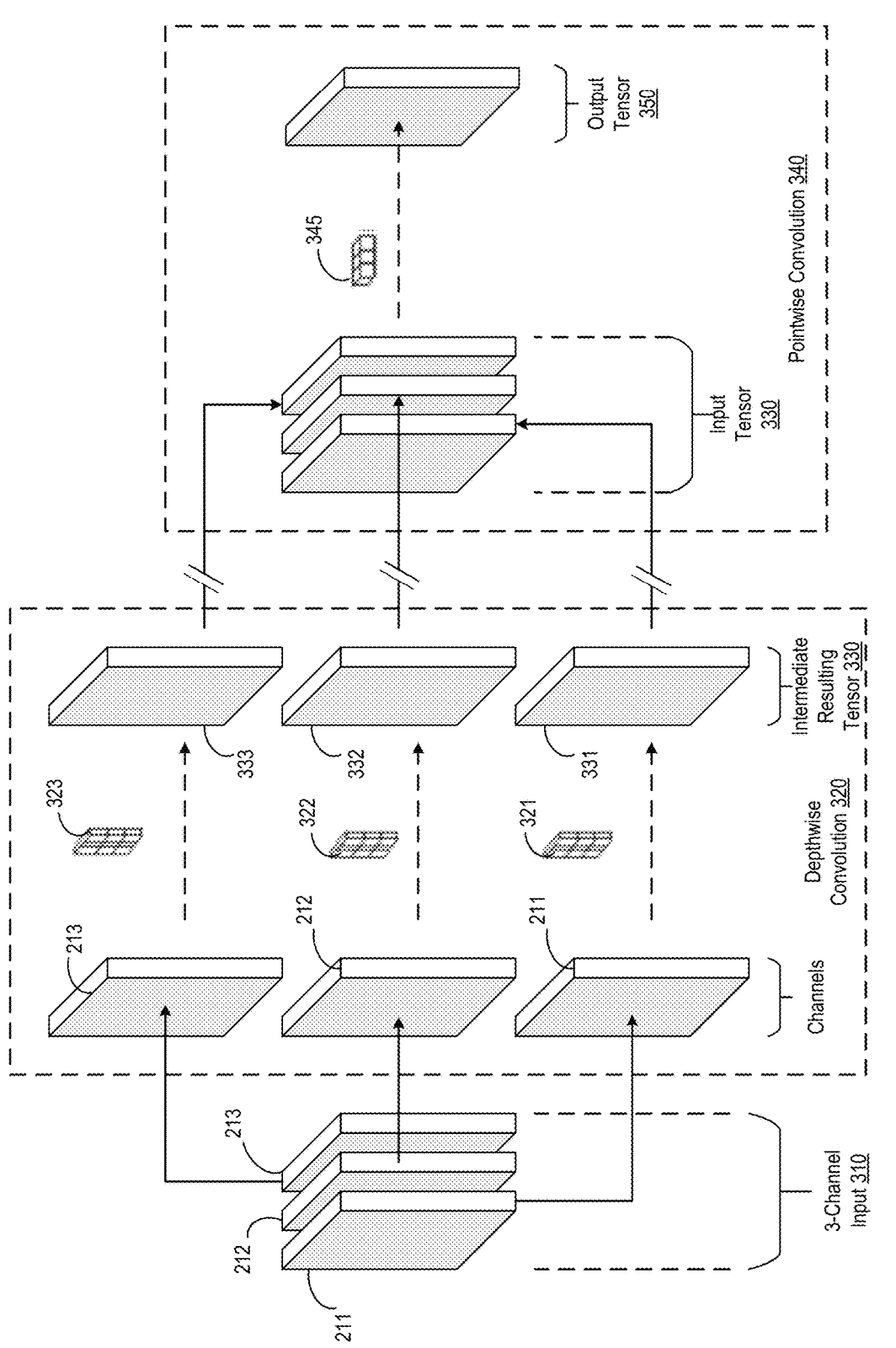
FIG. 3 is an illustration of convolutions in accordance with one or more embodiments.

FIG. 3 is an illustration of convolutions in accordance with one or more embodiments. In the example, processor (120) initially executes a depth-wise convolution operation (320). The depth-wise convolution operation (320) receives a 3-channel input (310), which is a 3D tensor. The 3-channel input (310) includes channel (211), channel (212), and channel (213) from FIG. 2. The depth-wise convolution (320) may use one or more filters (321, 322, 323) on channel (211), channel (212), and channel (213). In various embodiments, filters (321, 322, 323) may represent a kernel, a convolution matrix, or a mask. By way of example, filters (321, 322, 323) may comprise a small matrix used, for example, for blurring, sharpening, embossing, edge detection, and more. This is accomplished by doing a convolution between the kernel and the channel layers of the image to produce a plurality of intermediate results (330).

In FIG. 3, the depth-wise convolution (320) uses filters (321, 322, 323) on channel (211) to render intermediate results (331). The depth-wise convolution (320) also uses the filters (321, 322, 323) on channel (212) to render intermediate results (332). Finally, depth-wise convolution (320) also uses the filters (321, 322, 323) on channel (213) to render intermediate results (333). Each of the intermediate results may have a single channel or multiple channels. Further, the intermediate results may have a different number of rows and columns than in the channel of the input tensor.

Continuing with the example, the intermediate resulting tensor may be passed as input to the subsequent layers of the CNN. One of the subsequent layers of the CNN may perform a pointwise convolution operation (340). As denoted by the parallel lines, additional layers, such as layers that execute a non-linear activation function, may exist between the depthwise and pointwise convolution. The additional layers may modify the various inputs. The pointwise convolution operation (340) receives a 3-intermediate layer input (330), which may be further modified by the additional layers. The pointwise convolution (340) uses a filter (345) on intermediate layer (331), intermediate layer (332), and intermediate layer (333) to render the output tensor (350). The output tensor may be a different size than the input tensor.

Image processing CNN models may store intermediate results in 3-dimensional tensors. As described above, the dimensions may be described as height, width, and number of channels. Objects may be stored in any arrangement desired. By way of example, a tensor T may have height H, width W, and channels C, where height H represents the total number of rows and width W represents the total number of columns in the tensor.

The values of the elements of the tensor T are stored a channels-first arrangement. In the channels-first arrangement, an element of tensor T at location h, w, c is located at memory location $m[c*H*W+h*W+w]$.

FIGS. 4, 5, and 6 show examples of a channels-first ordering of elements of a tensor, a channels-last ordering of elements of a tensor, and a word-based channels-last ordering (WBCLO) of elements of a tensor, respectively. FIG. 4 is a diagram of a memory array (400) organized using a channels-first ordering of data. In FIG. 4, m[n] represents the nth element in memory. Lowercase letters represent values of the current channel c, row h, or column w. Uppercase letters indicate the dimensions (total number of channels C, total number of rows H, and total number of columns W) of the tensor T. FIG. 4 shows the respective memory location for channel, column, and row data within tensor T. In FIG. 4, memory numbering starts from zero. Thus, memory location 0 (m[0]) contains the data of channel 0, row 0, column 0. Memory location1 (m[1]) contains the data of channel 0, row 0, column 1. Memory location W (m[W]) contains the data of channel 0, row 1, column 0. Memory location H*W (m[H*W]) contains the data of channel 1, row 0, column 0. The first row is stored consecutively in memory, followed by the second row, through all the rows in the first channel. In this channels-first arrangement, a single channel array is stored in memory, one row at a time. Notably, the values of the elements of the tensor in different channels and located in the same row and column are separated from each other. Rather, the values of the elements in the same rows are adjacent.

In an alternative embodiment, the values of the elements of tensor T may be stored using a channels-last arrangement. In the channels-last arrangement, an element of tensor T at location h, w, c is located at memory location $m[h*W*C+w*C+c]$.

FIG. 5 is a diagram of a memory array (500) organized using a channels-last ordering of data. In FIG. 5, m[n] represents memory location n. Lowercase letters represent location of the element in channel c, column w, or row h. Uppercase letters indicate the dimensions (total number of channels C, columns W, and rows H of the tensor). FIG. 5 shows the respective memory location for particular sets of row, column, and channel data of elements within tensor T. In FIG. 5, numbering starts from zero. Memory location 0 (m[0]) contains the value of the element of the tensor at column 0, row 0, channel 0. Memory location 1 (m[1]) contains the data of column 0, row 0, channel 1.

In the memory organization of FIG. 5, the elements at the same row and column and different channels are adjacent. Notably, the values of the elements in same channel and located in the different row and/or different column are separated from each other. At memory location C (m[C]), values of all channels of elements at column 0 and row 0 have been stored in the earlier memory locations, so the column is incremented, and the next channel data is stored. Memory location C (m[C]) contains the data of row 0, column 1, channel 0. Memory location C+1 (m[C+1]) contains the data of row 0, column 1, channel 1. Thus, in the original image, all channel values for a single pixel are contained in consecutive memory locations.

FIG. 6 is an example diagram of a memory array (600) organized using a word-based channels-last ordering (WB-CLO) of data according to embodiment of the present disclosure. Lowercase letters represent values of the element at channel c, row h, or column w. Uppercase letters indicate the dimensions (total number of channels C, total number of rows H, and total number of columns W) of the tensor T. In the WBCLO arrangement, an element of tensor T at location h, w, c is located at memory location m[h*W*C+div(w,4) *4*C+4*c+mod(w,4)]. Here, div( ) is the integer division function and mod( ) is the modulus remainder function. In FIG. 6, the channel values for four consecutive pixels are stored in consecutive memory locations. Each 4-element word is from the same channel of data and may be accessed efficiently with increment operations. In some embodiments, the element is a byte (8 bits) and each word is four bytes (32 bits). In other embodiments, the element may be 16 bits and the word could be 32 or 64 bits. In some embodiments, the output of a depth-wise convolution (e.g., intermediate layers 331, 332, 333) may be stored in a WBCLO format. A downstream pointwise convolution operation (340) may therefore access four (4) 8 bit element memory locations in sequence in a single memory access to, for example, a 32-bit word. These four memory locations hold the same four pixels of data across four different channels. The pointwise convolution may operate on these four pixels in parallel. The output of the pointwise convolution may be stored in a conventional channels-first format in preparation for a depth-wise convolution layer.

In the word-based channels last ordering of FIG. 6, byte 0 of a first word contains the data of row 0, column 0, channel 0. Byte 1 of the first word contains the data of row 0, column 1, channel. Byte 2 of the first word contains the data of row 0, column 2, channel 0. Byte 3 of the first word contains the data of row 0, column 3, channel 0. At byte 4, the channel is incremented and the channel 1 information for the same four pixels are stored in the next four consecutive memory locations (i.e., the next four bytes).

The embodiment of FIG. 6 groups data in 4-byte words from the same channel, but other word-based orderings may be used in other embodiments. In other embodiments, a larger or smaller number of bytes may be stored from the same channel consecutively within the memory array. The number of bytes from the same channel that are stored consecutively may be chosen based on the size of filters and kernels in a particular network structure. The number of bytes from the same channel that are stored consecutively may be chosen based on specific architectural limitations of a system implementing the neural network model. In other embodiments, the byte ordering within a word may be reversed, or otherwise shuffled based on the system. For example, big-endian and little-endian are two common different orderings of bytes with a word.

FIG. 7 shows a more generic diagram of the memory array (700) according to a WBCLO scheme. As shown in FIG. 7, the memory array (700) is divided into words (e.g., Word 0 (702), Word 1 (704), . . . ). The word size (706) is the size of each word. The term word size is synonymous with word length and complies with the standard definition used in the art of computer science to refer to the number of bits processed by a hardware processor at a same time. For example, the word size may be 16 bits, 32 bits, etc. The word size (706) is dependent on the processor architecture.

The number of elements in each word is the word size divided by the number of bits used to represent the value of each element. Thus, a 32-bit processor has a word size of 32-bits. If the value of each element is represented by 8 bits, then each word has 4 elements.

As discussed above, a 3D tensor has three dimensions (i.e., a first dimension, a second dimension, and a third dimension). In the above examples, the third dimension is a channel dimension. The first dimension may be along the height or along the width (i.e., rows or columns), and the second dimension is along the width or the height (i.e., orthogonal to the first dimension). Other mappings between the first, second, and third dimensions and the height, width, and channel dimensions may be used without departing from the scope of the claims.

In the WBCLO scheme, within a word, the elements have sequential index values along a first dimension. Further, within a word, the elements have the same index values along the second and third dimension. Adjacent words are composed of elements having different index values for the third dimension of the tensor. Adjacency of words means that the words of the tensor are sequentially located. However, adjacency of words also means that other data may optionally exist between adjacent words of the tensor. By way of an example, the other data may be data unrelated to the tensor or data that is not in the tensor. Further, sequentially adjacent words may have elements having the same index values as immediately preceding word for the first and second dimensions of the tensor. Namely, along the first dimension, the elements have the same sequence of index values as the elements in the previous word, and, along the second dimension, the elements have the same index value as the elements in the previous word.

Thus, the ordering of storage is as follows. D1 is the total number of index values along the first dimension. D2 is the total number of index values along the second dimension. D3 is a total number of index values along the third dimension. Groups of words, each having D3 number of words, are stored contiguously in memory. Within each group of words, the elements in a word have the same index value along the third dimension, within the word and a different index value, along the third dimension, than other words in the group. For example, within the group, the words may have consecutively increasing index values as the prior word in the group up to the total number of index values in the third dimension. Elements in different words in the same group of words have the same index values along the first and second dimensions. Notably elements in the same word may have different index values along the first and/or second dimension and the same index value along the third dimension.

Elements in different groups of words have different index values along the first and/or second dimensions. For example, elements in a subsequent group of words may have a sequentially increasing index value along the first and/or second dimension as the elements in the prior group of words. Thus, for example, the subsequent groups of words may have an incrementally increasing index value along the first dimension from the prior group of words up to D1 and the same index value for the second dimension. Then, the next group may restart the index value for the first dimension and increment the index value for the second dimension by 1.

Returning to the image example of FIG. 2, the tensor is an image, and the channels are red value, green value, and blue value of the pixels. The first and second dimension are the rows and columns of the image. In the example, the word size is 32 bits and the number of bits for each value is 8 bits. Thus, there are 4 elements in each word. The elements are the red values of the pixels, the blue values of the pixels, or the green values of the pixels. In a WBCLO storage scheme, the system stores the pixel channel elements as follows. The memory stores the red values of the first four pixels along a single row adjacent to the green values of the first four pixels adjacent to the blue values of the first four pixels. The entire storage of the red, green, and blue values of the first four pixels of the row forms the first group of elements. After the first four pixels are entirely stored, the memory stores, adjacent to the first group, the group for the next four pixels along the row and repeats the process for the red, blue, and green channels of the next four pixels. When the row is complete, the next group is the next row of pixels starting with the first group of four pixels in the next row.

Figure 8:
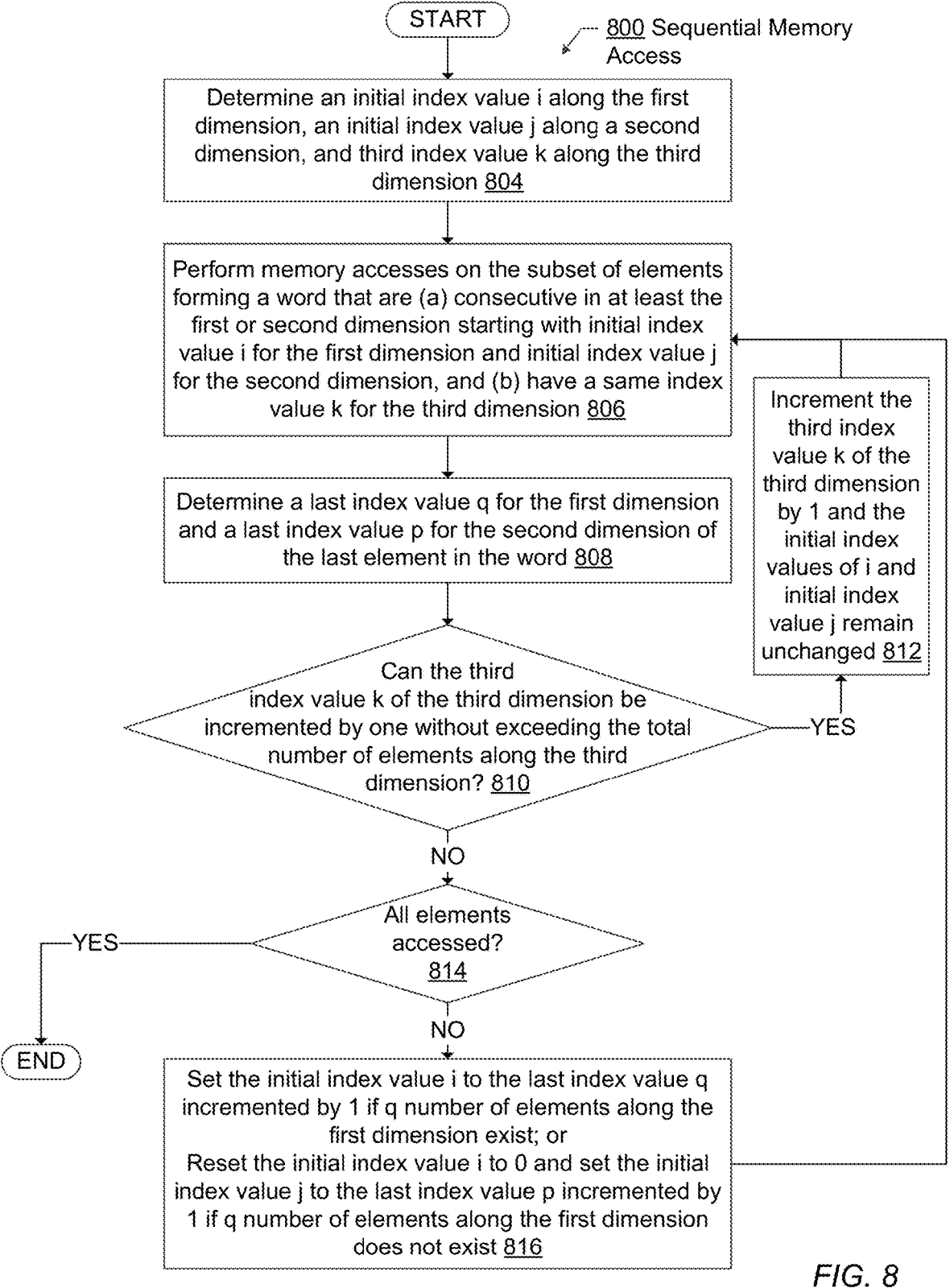
FIG. 8 shows a flowchart, in accordance with one or more embodiments.

FIG. 8 shows a flowchart for sequential memory access (800) of a 3D tensor in accordance with one or more embodiments. In 804, an initial index value i along the first dimension, an initial index value j along a second dimension, and third index value k along the third dimension are determined. At the start of the operations, the initial index values of the first, second, and third dimensions are each zero in one or more embodiments.

In 806, memory accesses are performed on the subset of elements forming a word that are (a) consecutive in at least the first or second dimension starting with initial index value i for the first dimension and initial index value j for the second dimension, and (b) have a same index value k for the third dimension. The memory access selects the consecutive index values for the first dimension starting with the initial index value i for the first dimension and having initial index value j for the second dimension. If the number of elements in the subset is greater than the number of elements remaining along the first dimension starting with the initial index value i, then the system adds elements starting at index value 0 for the first dimension, and index value j+1 for the second dimension to complete the word. The memory access may be, for example, to save a value of an element in the memory or read a value of an element from memory.

In 808, a last index value q for the first dimension and a last index value p for the second dimension of the last element in the word are determined.

In 810, a determination is made whether the third index value k of the third dimension can be incremented by one without exceeding the total number of elements along the third dimension. If the third index value can be incremented, the flow proceeds to Block 812. If the third index value cannot be incremented, the flow proceeds to Block 814.

In Block 812, the third index value k of the third dimension is incremented by 1 and the initial index values of i and initial index value j remain unchanged. Then, the flow transitions to Block 806 with initial index values i, j, and k for the first, second, and third dimensions.

In Block 814, a determination is made whether all elements are accessed. If all elements of the tensor are accessed, the flow proceeds to end. If all elements of the tensor are not accessed, the flow proceeds to Block 816.

In Block 816, the initial index value i is set to the last index value q incremented by 1 if q number of elements along the first dimension exist or the initial index value i is reset to 0 and the initial index value j is set to the last index value p incremented by 1 if q number of elements along the first dimension does not exist. The flow then proceeds to Block 806.

By way of example, in an embodiment in which C=4, the processor (120) may store channel (211) data for the first four pixels [(P1,1) (P1,2), (P1,3), (P1,4)] in FIG. 2 in four consecutive bytes (bytes 0, 1, 2, 3) of a first 32-bit word. Next, the processor (120) stores channel (212) data for the first four pixels [(P1,1) (P1,2), (P1,3), (P1,4)] in FIG. 2 in the next four consecutive bytes (bytes 4, 5, 6, 7) of a second 32-bit word. Next, the processor (120) may store channel (213) data for the first four pixels [(P1,1) (P1,2), (P1,3), (P1,4)] in FIG. 2 in the next four consecutive bytes (bytes 8, 9, 10, 11) of a third 32-bit word. The processor (120) may then store data for a fourth channel (not shown) for the first four pixels [(P1,1) (P1,2), (P1,3), (P1,4)] in FIG. 2 in the next four consecutive bytes (bytes 12, 13, 14, 15) of a fourth 32-bit word. At this point, the processor (120) can increment to the next group of four pixels and store the channel data for pixels [(P1,5) (P1,6), (P1,7), (P1,8)].

FIG. 9 shows a flowchart for accessing memory for a depthwise convolution operation (900) in accordance with one or more embodiments. The depthwise convolution operation accesses every kth word, where k is the number of channels. In Block 902, the current channel number is set to zero. Specifically, the current channel number is the first channel in the tensor. In Block 904, the current starting word location is set to the current channel number. The starting word location is the location of the initial word of the channel identified by the current channel number. Initially, the current starting word is also set to zero as in Block 902.

In Block 906, the current word location is set to the current starting word location. The current word location is the location of the current word being accessed. As discussed above, the current word has elements that are adjacent (e.g., in a row) in the spatial dimensions of the tensor and they have the same current channel number in the channel dimension.

In Block 908, memory access is performed at the current word location. The current word location may be translated to a physical memory location. For example, the translation may be based on the start of the tensor in physical memory. The translation may also be based on the possible separation of words of the tensor in memory, such as with other data that is between the words. The memory access may be to read or write elements to memory. Based on the memory access, the depthwise convolution operations is performed. The depthwise convolution operation may be performed, for example, after a preset number of words are obtained or anytime prior to performing Block 914 to move to the next channel.

In Block 910, the current word location is incremented by the number of channels. Incrementing the current word location moves the current word location to the location of the subsequent set of elements of the same channel as the prior word.

In Block 912, a determination is made whether the current word location is greater than the total number of elements divided by the number of elements in each word minus one. The total number of elements divided by the number of elements in each word is the number of words of the tensor. Thus, if the current word location is greater than the total number of elements divided by the number of elements in each word minus one, then the current word location is outside the bounds of the tensor and the elements of the tensor have been processed for the current channel.

In Block 914, the current channel number is incremented by one. Incrementing the current channel number initiates the processing of the next channel. A determination is made whether the current channel number is greater than the total number of channels minus one in Block 916. If the current channel number is greater than the total number of channels minus one, then elements of all channels of the tensor have been processed and the flow proceeds to end. If the current channel number is not greater than the total number of channels minus one, then the flow proceed to process the elements of the next channel identified by the current channel number. The process of FIG. 9 repeats for each channel.

Figure 10:
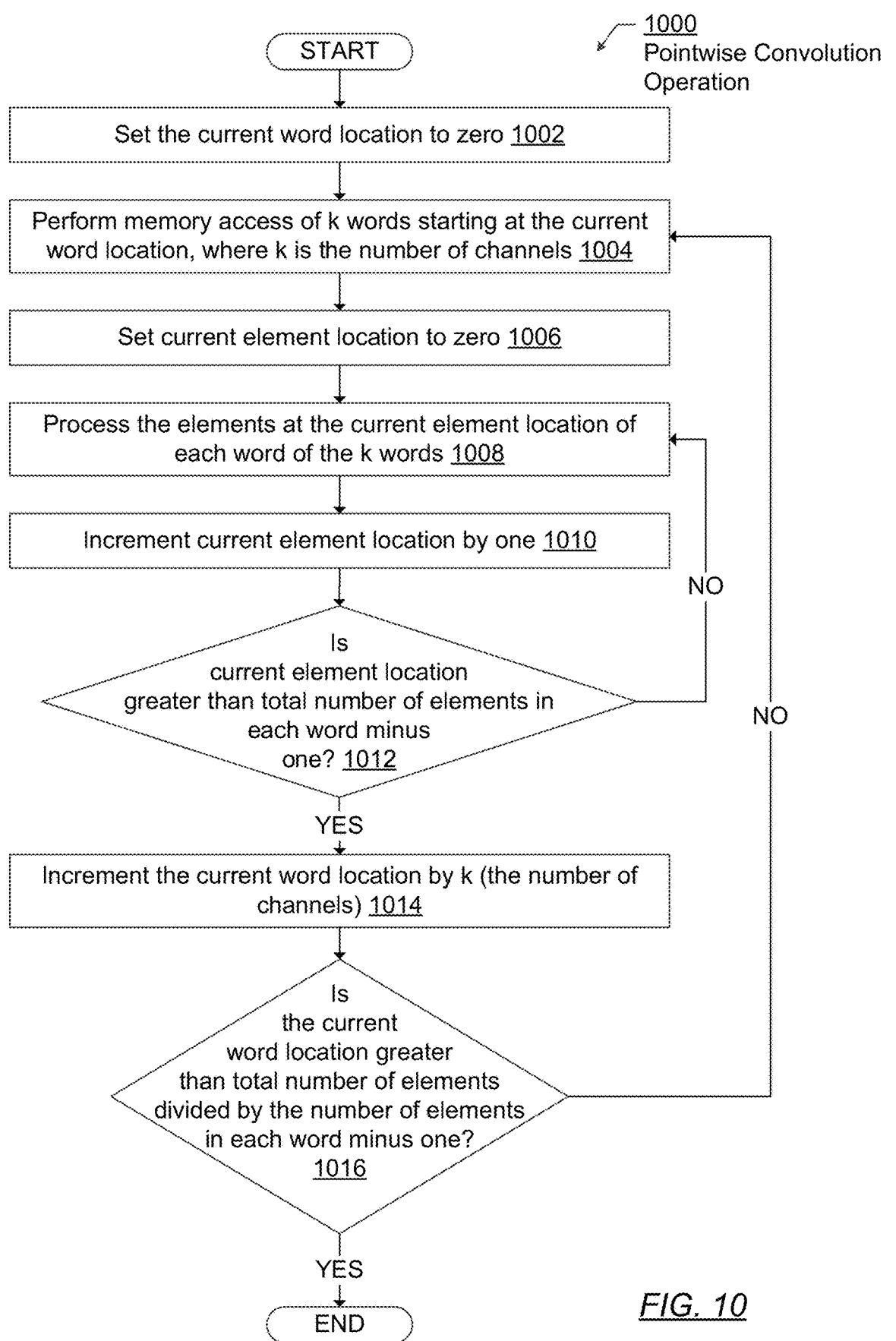
FIG. 10 shows a flowchart, in accordance with one or more embodiments.

FIG. 10 shows a flowchart for performing a pointwise convolution operation. In the pointwise convolution operation, k adjacent words of memory are accessed, where k is the number of channels. The pointwise convolution operation performs operations, individually, on each of pixel or features of the k words. The other elements of the k words may be saved in cache while the processor executes.

Turning to Block 1002, the current word location is set to zero. The current word location is the location of the current word being accessed.

In Block 1004, memory accesses of k words starting at the current word location is performed, where k is the number of channels. Performing the memory accesses is described above with reference to Block 908 of FIG. 9. Specifically, the word locations of the k words may each be translated to a physical memory location. For example, the translation may be based on the start of the tensor in physical memory. The translation may also be based on the possible separation of words of the tensor in memory, such as with other data that is between the words. The memory access may be to read or write elements to memory.

In Block 1006, the current element location is set to zero. The elements at the current element location of each of the k words is processed in Block 1008. The pointwise convolution operation processes the same position of element in each word of the k words accessed in Block 1008. Remaining elements of the k words may be stored in cache memory, for example.

In Block 1010, the current element location is incremented by one. A determination is then made if the current element location is greater than the number of elements in each word minus one. If the current element location is not greater than the number of elements in each word minus one, then not all the elements of the k words are processed and the system iterates to the next k words. Thus, the flow proceeds to the next set of elements of the k words in Block 1008.

If the current element location is greater than the number of elements in each word minus one, then the elements of the k words are processed and the system iterates to the next k words. In Block 1014, the current word location is incremented by k (i.e., the number of channels) to iterate to processing the next set of channels.

In Block 1016, a determination is made whether the current word location is greater than the total number of elements divided by the number of elements in each word minus one. The total number of elements divided by the number of elements in each word is the number of words of the tensor. Thus, if the current word location is greater than the total number of elements divided by the number of elements in each word minus one, then the current word location is outside the bounds of the tensor and the elements of the tensor have been processed. Accordingly, the pointwise convolution operation is complete and the flow may proceed to end.

Although the above is discussed in relation to CNN, one or more embodiments may be used for tensor data of any neural network. For example, one or more embodiments may be used in audio processing using spectrograms.

While the invention has been described with respect to a limited number of embodiments, those skilled in the art, having benefit of this disclosure, will appreciate that other embodiments can be devised which do not depart from the scope of the invention as disclosed herein.

What is claimed is:
1. A computing device comprising:
a memory; and a processor configured to:
perform a plurality of memory accesses of a plurality of groups of words,
wherein each group of the plurality of groups of words are stored in a contiguous section of the memory,
wherein each group of the plurality of groups of words comprises a plurality of words, the plurality of words each comprising a plurality of elements having a set of sequential index values for a first dimension of a tensor, a same index value for a second dimension of the tensor and a same index value for a third dimension of the tensor,
wherein each of the plurality of words in each group of the plurality of groups of words has the set of index values for the first dimension, the same index value for the second dimension, and a different index value for the third dimension of the tensor, and
wherein the first dimension and the second dimension are spatial dimensions, and the third dimension is a channel dimension; and
execute a layer of a neural network model using the plurality of memory accesses.
2. The computing device of claim 1, wherein the plurality of words comprises a first word having a first subset of the plurality of elements, the first subset of the plurality of elements each having: a first set of sequential index values along the first dimension of the tensor, a first single index value for the second dimension of the tensor, and a second single index value for the third dimension of the tensor.
3. The computing device of claim 2, wherein the plurality of words comprises a second word having a second subset of the plurality of elements, the second subset of the plurality of elements each having: the first set of sequential index values along the first dimension of the tensor, the first single index value for the second dimension of the tensor, and a third single index value for the third dimension of the tensor that is different than the second single index value.
4. The computing device of claim 1, wherein the first dimension is a column dimension and the second dimension is a row dimension.
5. The computing device of claim 1, wherein the processor is further configured to execute a convolutional neural network model to perform a depth-wise convolution operation using a plurality of filters.
6. The computing device of claim 1, wherein the processor is further configured to execute a convolutional neural network model to perform a pointwise convolution stage using a filter.
7. The computing device of claim 1, wherein each group of the plurality of groups has a same number of words as a number of index values along the third dimension.
8. A memory device comprising:
a plurality of groups of words, wherein each group of the plurality of groups of words are stored in a contiguous section of a memory,
wherein each group of the plurality of groups of words comprises a plurality of words, the plurality of words each comprising a plurality of elements having a set of sequential index values for a first dimension of a tensor, a same index value for a second dimension of the tensor and a same index value for a third dimension of the tensor,
wherein each of the plurality of words in each group of the plurality of groups of words has the set of index values for the first dimension, the same index value for the second dimension, and a different index value for the third dimension of the tensor, and wherein the first dimension and the second dimension are spatial dimensions, and the third dimension is a channel dimension.

9. The memory device of claim 8, wherein the plurality of words comprises a first word having a first subset of the plurality of elements, the first subset of the plurality of elements each having: a first set of sequential index values along the first dimension of the tensor, a first single index value for the second dimension of the tensor, and a second single index value for the third dimension of the tensor.

10. The memory device of claim 9, wherein the plurality of words comprises a second word having a second subset of the plurality of elements, the second subset of the plurality of elements each having: the first set of sequential index values along the first dimension of the tensor, the first single index value for the second dimension of the tensor, and a third single index value for the third dimension of the tensor that is different than the second single index value.

11. The memory of claim 8, wherein the first dimension is a column dimension, the second dimension is a row dimension, and the third dimension is a channel dimension.

12. The memory of claim 8, wherein each group of the plurality of groups has a same number of words as a number of index values along the third dimension.

13. A method comprising:
performing a plurality of memory accesses of a plurality of groups of words,
wherein each group of the plurality of groups of words are stored in a contiguous section of memory, wherein each group of the plurality of groups of words comprises a plurality of words, the plurality of words each comprising a plurality of elements having a same set of sequential index values for a first dimension of a tensor, a same index value for a second dimension of the tensor and a same index value for a third dimension of the tensor,
wherein each of the plurality of words in each group of the plurality of groups of words has the set of index values for the first dimension, the same index value for the second dimension, and a different index value for the third dimension of the tensor,
wherein the first dimension and the second dimension are spatial dimensions, and the third dimension is a channel dimension; and
executing a layer of a neural network model using the plurality of memory accesses.

14. The method of claim 13, wherein each group has a same number of words as a number of index values along the third dimension.

15. The method of claim 13, further comprising:
executing a depth-wise convolution operation on the plurality of words.

16. The method of claim 13, further comprising:
executing a point-wise convolution operation on the plurality of words.

* * * * *